UNITED STATES PATENT OFFICE.

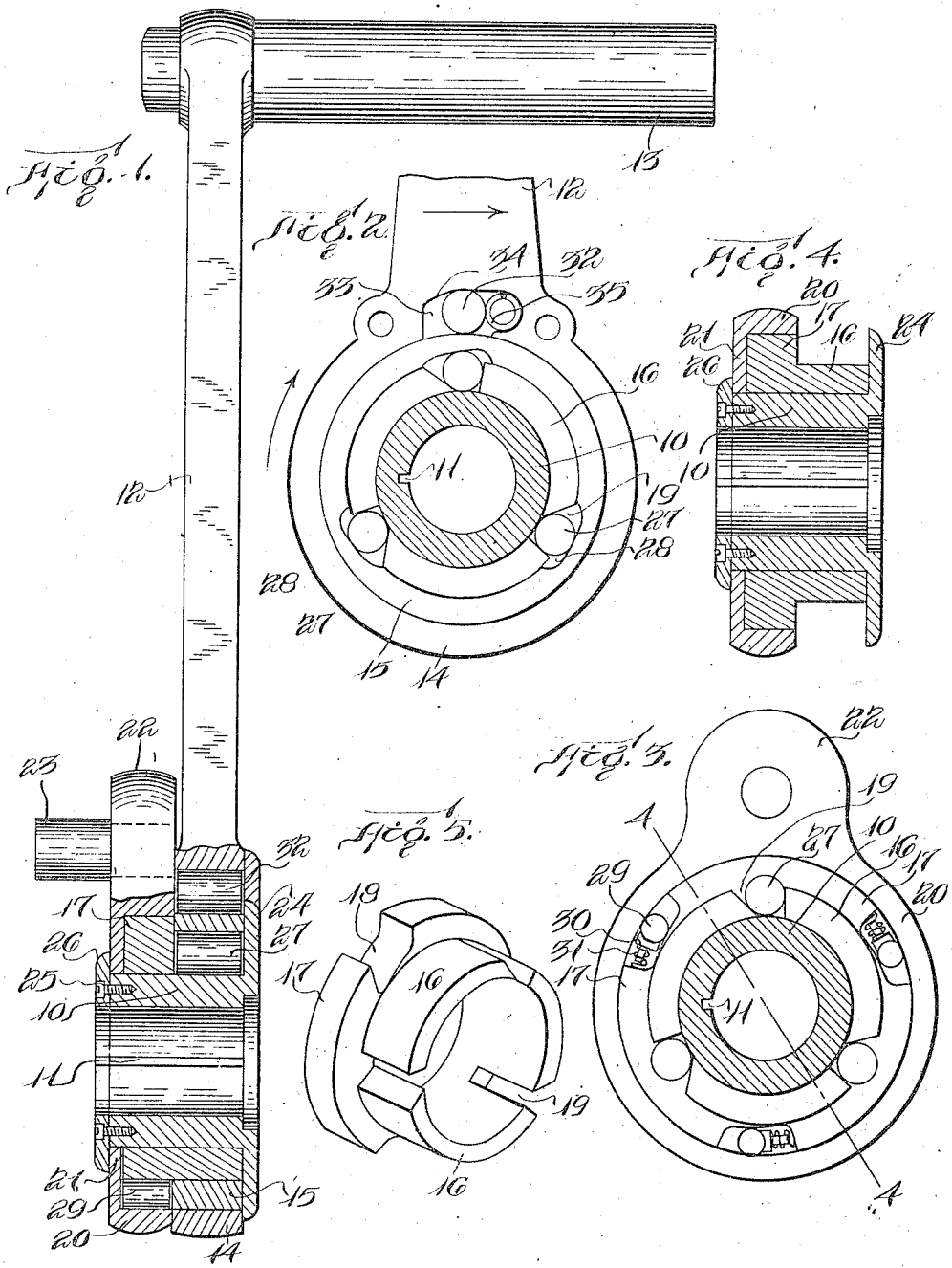

EDWARD A. MARSH, OF WEST NEWTON, MASSACHUSETTS, ASSIGNOR TO THE OULFORD COMPANY, OF BOSTON, MASSACHUSETTS, A CORPORATION OF MASSACHUSETTS.

SAFETY MOTOR-STARTING CRANK.

1,163,551.  Specification of Letters Patent.  Patented Dec. 7, 1915.

Application filed November 6, 1914. Serial No. 870,674.

*To all whom it may concern:*

Be it known that I, EDWARD A. MARSH, a citizen of the United States, and resident of West Newton, in the county of Middlesex and State of Massachusetts, have invented certain new and useful Improvements in Safety Motor-Starting Cranks, of which the following is a specification.

The present invention relates to cranks used for the manual starting of internal combustion motors, such as automobile motors, motor boat engines, and in fact all motors which are capable of being started by hand.

The object of the invention is to provide in connection with a crank of this sort a device for automatically disengaging the crank from the shaft of the motor on which it is mounted in case of a backfire or kick back of the motor so as to avoid danger of injuring the operator. It is well known that many injuries have occurred from the sudden and unexpected backward driving of a starting crank due to premature ignition in the cylinder of the motor. My invention is designed to avoid all danger of such accidents by causing the crank to become disconnected from the shaft of the motor upon the instant that the shaft commences to rotate in the reverse direction.

The nature of the invention and the manner in which the same accomplishes the object sought and above set forth, are explained in the following specification in connection with that one of the possible embodiments of the invention which is described in the following specification and illustrated in the accompanying drawings.

In the drawings, Figure 1 is a side view of a motor starting crank with the hub thereof in section, shown in connection with the safety device or controller and a sleeve which is adapted to be placed upon the crank shaft of an internal combustion motor or upon some other shaft which may be engaged with the crank shaft. Fig. 2 is a front elevation of the same with the crank shown as broken off and the sleeve of the shaft mounting in section. Fig. 3 is a view similar to Fig. 2 but representing the crank as being entirely removed. Fig. 4 is a sectional view on line 4—4 of Fig. 3. Fig. 5 is a perspective view of the member which forms the safety device or controller of the crank.

The same reference characters indicate the same parts in all the figures.

In the embodiment of my invention shown in the drawings, 10 represents a sleeve which is adapted to be slipped upon the crank shaft of an internal combustion motor, or upon the stud shaft which is commonly mounted in automobiles in line with the crank shaft of the motor to carry the ordinary starting crank or upon a shaft of any other description geared or otherwise connected directly or indirectly with the motor crank shaft. This sleeve supports the crank and the controller or safety device and is provided in order to connect the crank and the controller together in a mechanism which may be carried and stowed away as a unit and may be mounted upon any shaft without requiring to be taken down and reassembled. The sleeve has a keyway 11 adapted to engage a key on the shaft whereon it is mounted to prevent its rotation about the shaft, and when so mounted the sleeve is in effect a part of the shaft, and may be considered as representing a shaft. So far as the safety feature of the present invention is concerned, the sleeve is unnecessary and may be omitted altogether and the crank and controller applied directly upon the shaft, since the sole function of the sleeve is to serve as a connector for the crank and controller to enable them to be placed upon and removed from the shaft as a unit: but as to such function said sleeve is a necessary part of my invention, and is so claimed.

The crank is shown at 12 and the handle which is grasped by the hand of the operator is shown at 13. The hub 14 of the crank surrounds sleeve 10 and is made of a sufficiently large diameter to embrace also a ring 15 and the tubular sleeve 16 of the controller.

The safety device or controller referred to is a tubular member, which has a sliding fit on the sleeve 10 so that it may rotate freely thereon without binding. At one end it has a laterally or radially projecting flange 17 interrupted by notches 18, and its other end is intersected by one or more slots 19 extending parallel to its axis. The ring 15 has a sliding fit on the controller beside the flange 17, and the hub 14 of the crank surrounds ring 15 and is capable of sliding about the same. A holder 20 of annular form surrounds the flange 17 of the controller and has a web 21 at one end overlying the face of the flange 17 and fitting closely about the sleeve 10 but with freedom enough to permit rotation of the sleeve within it. Holder 20 is formed with a lug 22 from which projects a stud 23 adapted to be engaged with a stationary part of the engine frame or bed, or of the vehicle, or boat, wherein the engine is installed. Sleeve 10 has a flange 24 at one end overlying ring 15 and crank hub 14 to hold the latter against the flange 17 and the holder 20, and on its other end there is detachably secured by screws 25 an annular retainer 26 which overlaps the web of the holder.

In the slots 19 of the controller are placed rolls 27, each of which lies between the outer cylindrical surface of the sleeve 10 and the inner surface or bottom of a recess 28 of ring 15, and projects into such recess. The bounding walls of these recesses are slightly eccentric to the outer surface of the sleeve so as to crowd the rolls against the sleeve under certain conditions, constituting, in connection with the rolls, clutches of well known character. There may be one or more of such clutches, and in the illustrated embodiment of the invention there are three. The inner surfaces of all the recesses 28 are eccentric in the same manner and to the same degree so that the several clutch elements will act in unison.

In the notches 18 are also placed rolls 29 which lie between the inner surfaces of such notches and the inner cylindrical surface of the holder 20. The bottoms or inner surfaces of the notches are inclined or eccentric to the holder and the rolls 29 are adapted to be gripped therein under certain conditions. There are one or more notches 18 and rolls 29, each forming a roller clutch. To facilitate the gripping of these clutches I provide a follower 30 in each notch 18 and a spring 31 to press the follower toward the roll and urge the latter toward the shallower end of the notch, the follower and spring being located in the deeper part of the notch. There is also provided a clutch of similar character between the crank and the ring 15, the same comprising a roll 32 located in a recess 33 in the crank, such recess having its outer surface 34 eccentric to the outer surface of the ring 15. A spring 35 is provided to press the roll yieldingly toward the end of the recess where the surface 34 is nearest to the ring.

It will be observed from the foregoing description in connection with the drawings that the outer surface of the sleeve 10, the outer surface of the ring 15 and the inner surface of the holder 20 are all cylindrical and concentric and that the bottoms of the recesses or notches 28, 18, and 33 are eccentric to these surfaces.

The mode of operation of the device may now be understood, and is as follows. Assuming that the sleeve 10 is fitted on the crank shaft or starting shaft of the motor, and that it is desired to start the motor, the operator grasps the handle 13 and turns the crank in the required direction, this direction being indicated by the arrow in Fig. 2. The first effect produced is to bind the clutch roll 32 between the eccentric surface 34 and the cylindrical outer surface of the ring 15 and to cause the ring to turn with the crank. The next effect is to couple the ring with the sleeve 10 by the wedging of the clutch rolls 27 between the inclined or eccentric binding surfaces of the recesses 28 and the cylindrical surface of the sleeve 10. The sleeve and starting shaft now turn with the crank and are thus turned until the motor starts.

If the motor starts in the right direction, the sleeve 10 is immediately driven faster than the crank and the clutch rolls 27 and 32 are rolled into the deeper parts of their respective recesses where they become disengaged and permit the sleeve to continue in rotation and the crank to remain stationary. But if a backfire occurs and the engine starts to rotate in the reverse direction, the clutch rolls become more firmly engaged than before and the crank would be driven reversely, to the injury of the operator, if it were not for the controlling safety device. This device is in engagement with the clutch rolls 27, there being a segment of the device adjacent to each roll, as clearly appears from Figs. 2 and 3. In the normal rotation of the crank the controller turns with it and the clutch rolls 29 travel along inside of the holder 20, but in case of a backfire in the motor and reversed rotation of the shaft, the first back movement of the controller causes the clutch rolls 29 to be gripped between the stationary holder 20 and the outwardly inclined eccentric inner surfaces of the notches 18, preventing rotation of the controller. This effect occurs instantly because the spring followers tend always to hold the clutch rolls 29 in the position where they make contact with the opposed clutching surfaces, so that the clutching effect occurs as soon as any movement of the controller takes place in the clutching direction. The controller being thus locked against movement by the holder 20, which, as before stated, is engaged with a stationary part of the frame so that it can not rotate, obstructs the rolls 27 in their rotary travel with the shaft, making it absolutely impossible for these rolls to revolve reversely with the shaft, and thereby disengaging the crank from the shaft; because, as the rolls which clutch the crank to the shaft in the normal operation are now held stationary, the reverse motion of the shaft can not be transmitted to the crank. This final effect, that of disconnecting the crank from the shaft, occurs instantly and before the crank has moved backward far enough to give even a slight shock to the hand or arm of the operator.

It will be understood from the foregoing description that the main elements of the invention consist of the combination with a shaft, of a crank and a controller both mounted loosely upon the shaft, that is, so that they may turn about the same, a clutching device which is operated automatically when the crank is turned in the starting direction to couple the crank and the controller to the shaft so that both the controller and the shaft are caused to turn with the crank when the latter is started in rotating direction or forward direction, and another clutching device operating in connection with a stationary holder to arrest the controller upon reverse rotation of the shaft and thereby cause disengagement or uncoupling of the first clutch, although permitting the controller to revolve freely in the forward direction.

The sleeve 10 may be omitted and the crank and safety device mounted directly upon the shaft, the outer surface of which then becomes the clutching surface wherewith the primary clutch rolls 27 are gripped by the inclined interior surfaces of the crank hub. But when the device is mounted on the shaft, the sleeve becomes as much a part of the shaft as though it were an integral part thereof, and for the purposes of this invention and of the following claims, the sleeve may be considered as representative of the shaft, wherefore I intend the term "shaft" as used in the following claims to cover the sleeve as well as a shaft, and to cover also a combination of the shaft with the sleeve mounted upon it.

My safety crank above described is a compact unit which may be assembled at the factory and thereafter shipped and packed without becoming disassembled, and it may be mounted upon any shaft in place of the crank commonly provided in exactly the same way and with the same ease that a one piece crank is so applied, so that any one, including persons having no understanding of the inner construction and the mode of operation of my crank may apply it to the motor. I have intended to embrace within the term "crank" as used in the foregoing specification and the following claims, any element or device having the function of the starting crank of an automobile or other internal combustion motor, and whether the same is in the form of an arm or has a multiplicity of arms, such as a disk or a fly wheel.

It is, of course, to be understood that while I have described the clutch elements as rolls and the spaces 19 in the controller as slots, I have used these terms only descriptively and without limiting significance. Any elements and constructions which perform the functions of the clutch rolls and the slots 19 are equivalent to the described construction and are intended to be embraced within the descriptive terms used. For example, in place of cylindrical clutch rolls I might use balls or spheres and in place of forming the openings 19 as slots, such openings could be made as holes or perforations, only sufficiently large to contain freely whatever clutch element might be employed.

What I claim and desire to secure by Letters Patent is:—

1. A starting crank mechanism for internal combustion motors, comprising, in combination with a shaft, a crank mounted on said shaft and rotatable about the same, a clutch element between said crank and shaft constructed to engage when relative rotation between the crank and shaft takes place in one direction, and to be disengaged when such relative rotation takes place in the opposite direction, a controller also rotatable about the shaft and having an element extending axially between the shaft and the crank and beside said clutch element, and around which the crank is rotatable, a relatively stationary holder, and a clutch element between said holder and the controller constructed to become engaged when the controller is rotated in the direction opposite to the normal direction of rotation of the shaft.

2. A safety starting crank mechanism comprising, in combination with a shaft, a crank and a controller mounted to rotate about said shaft, a stationary holder with respect to which said shaft, said controller, and said crank are all rotatable, a clutch between the crank and the shaft constructed to couple the crank to the shaft when the crank is turned relatively to the shaft in the direction of normal rotation of the shaft, and to be disengaged when the relative rotation takes place in the opposite direction, a clutch between the controller and the holder constructed to be engaged when the controller is rotated in the direction opposite to the normal rotation of the shaft, and to be disengaged when the controller rotates in the opposite direction, said controller having a rigid portion extending into the path wherein the first-named clutch element travels, adapted to obstruct and disengage said element when the shaft is rotated in the reverse of the normal direction and the controller is held stationary.

3. A safety starting crank mechanism comprising, in combination with a shaft, a crank and a controller mounted to rotate about said shaft, a stationary holder with respect to which said shaft, said controller, and said crank are all rotatable, a clutch between the crank and the shaft constructed to couple the crank to the shaft when the crank is turned relatively to the shaft in the direction of normal rotation of the shaft, and to be disengaged when the relative rotation takes place in the opposite direction, a clutch between the controller and the holder constructed to be engaged when the controller is rotated in the direction opposite to the normal rotation of the shaft, and to be disengaged when the controller rotates in the opposite direction, said controller having a tubular portion extending between the shaft and the crank, and upon the exterior of which said crank has its bearing, said portion being provided with an aperture through which the first-named clutch element extends into engagement both with the shaft and the crank.

4. A safety starting crank mechanism for internal combustion motors comprising, in combination with a starting shaft, a crank, a controller, and a holder all surrounding said shaft, the said crank and controller being rotatable about the shaft, and said holder being stationary, said crank and controller constituting two rotating elements, one of which is provided with a segmental portion having a slot and extending between the shaft and the other of said elements, and the said other rotatable element having a clutching surface, a clutch roll contained in said slot between the shaft and said clutching surface, and a second clutch roll interposed between the controller and the holder, said controller having a clutching surface adjacent to the second clutch roll formed and arranged to bind the second clutch roll against the holder when the controller is rotated oppositely to the normal direction of rotation of the shaft.

5. A self contained motor starting apparatus comprising a sleeve adapted to be applied to and to form a part of the starting shaft of a motor, a crank, a controller, and a holder all surrounding said sleeve, the crank and controller being rotatable relatively to the sleeve, to the holder, and to each other, a clutch between the controller and the holder to permit rotation of the controller in one direction relatively to the holder and prevent such rotation in the opposite direction, and a clutch roll between the crank and controller and the sleeve, constructed to be crowded against the sleeve when the crank is turned in the direction in which rotation of the controller is permitted, said controller being constructed and arranged to release the second named clutch when the sleeve is turned in the direction in which rotation of the controller is prevented, the sleeve having means for holding the parts of the apparatus in coöperative relation.

6. A safety starting crank mechanism for internal combustion motors, comprising a shaft, two rotatable elements surrounding said shaft and adapted to rotate relatively to the shaft, one of said elements being a starting crank and the other being a controller, a clutch member interposed between one of said elements and the shaft and constructed to couple them together when said element is turned in one direction, an extension on the other of said elements lying adjacent to the shaft and in position to bear, when relative movement between the shaft and itself takes place, on said clutch member, a stationary holder adjacent to the controller, and a clutch device between said holder and controller constructed to permit rotation of the controller in the direction of normal rotation of the shaft, and to prevent movement of the controller in the opposite direction.

In testimony whereof I have affixed my signature, in presence of two witnesses.

EDWARD A. MARSH.

Witnesses:
C. F. BROWN,
P. W. PEZZETTI.